United States Patent [19]
Williams

[11] Patent Number: 5,954,149
[45] Date of Patent: Sep. 21, 1999

[54] VEHICLE CAB MOTION CONTROL

[75] Inventor: Daniel E. Williams, West Lafayette, Ind.

[73] Assignee: TRW Inc., Lyndhurst, Ohio

[21] Appl. No.: 08/815,444

[22] Filed: Mar. 11, 1997

[51] Int. Cl.⁶ .................................................. B62D 33/067
[52] U.S. Cl. ...................... 180/89.12; 180/89.14; 180/89.15; 180/417; 296/190.05; 296/190.07
[58] Field of Search ................................ 180/417, 89.12, 180/89.13, 89.14, 89.15; 296/190.04, 190.05, 190.07

[56] References Cited

U.S. PATENT DOCUMENTS

| | | |
|---|---|---|
| 3,841,694 | 10/1974 | Merkle . |
| 3,944,017 | 3/1976 | Foster . |
| 3,948,341 | 4/1976 | Foster . |
| 3,966,009 | 6/1976 | Meacock, II et al. . |
| 4,183,087 | 1/1980 | Huelsman . |
| 4,283,087 | 8/1981 | Kauss et al. . |
| 4,418,955 | 12/1983 | Muncke et al. . |
| 4,438,970 | 3/1984 | Boucher . |
| 4,753,328 | 6/1988 | Williams et al. . |
| 5,044,455 | 9/1991 | Tecco et al. . |
| 5,209,316 | 5/1993 | Bauer ................................... 180/89.14 |
| 5,447,332 | 9/1995 | Heyring . |
| 5,555,501 | 9/1996 | Furihata et al. . |
| 5,570,286 | 10/1996 | Margolis et al. . |

*Primary Examiner*—Eric D. Culbreth
*Attorney, Agent, or Firm*—Tarolli, Sundheim, Covell, Tummino & Szabo

[57] ABSTRACT

An apparatus (30) which controls the motion of a cab (12) of a vehicle relative to a frame of the vehicle includes a cab motion control motor (38). A pair of motor control valves (70 and 72) are provided to control fluid pressure conducted to the cab motion control motor (38). The motor control valves (70 and 72) are supplied with fluid under pressure by a power steering pump (22). The power steering pump (22) also provides fluid under pressure to a power steering motor (20) which is operable to turn steerable vehicle wheels (18).

5 Claims, 1 Drawing Sheet

VEHICLE CAB MOTION CONTROL

BACKGROUND OF THE INVENTION

The present invention relates to an apparatus which is operable to control motion of a cab of a vehicle relative to a frame of the vehicle.

It is known that a driver of a vehicle has a relatively high sensitivity to pitch motions, that is, alternating plunging and rising motions of the front of the vehicle. Air suspension seats have been helpful in reducing heave (vertical) inputs to the driver of a vehicle. However, air suspended seats have not been very helpful in controlling pitch motions.

To control pitching motion, it has been suggested that an air suspension could be located between a frame of a truck and a cab of the truck. One known apparatus for use in controlling pitching motion of the cab of a truck is disclosed in U.S. Pat. No. 5,044,455.

SUMMARY OF THE INVENTION

The present invention provides a new and improved apparatus for use in a vehicle having an operator's cab which is movable relative to a frame of the vehicle. The apparatus includes a cab motion control motor which is connected with the frame of the vehicle and the cab. A control unit effects operation of a motor control valve assembly in response to an input from sensors connected with the cab and frame of the vehicle. The motor control valve assembly effects operation of the cab motion control motor to oppose movement of the cab relative to the frame of the vehicle.

In one embodiment of the invention, a power steering pump on the vehicle is used to supply fluid to the motor control valve assembly which controls operation of the cab motion control motor. In addition, the power steering pump supplies fluid to a power steering motor which is operable to turn steerable vehicle wheels.

The motor control valve assembly includes a first motor control valve to control fluid pressure conducted to a first cylinder chamber of the cab motion control motor. A second motor control valve controls fluid pressure conducted to a second cylinder chamber of the cab motion control motor.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF ONE SPECIFIC PREFERRED EMBODIMENT OF THE INVENTION

Figure 1:
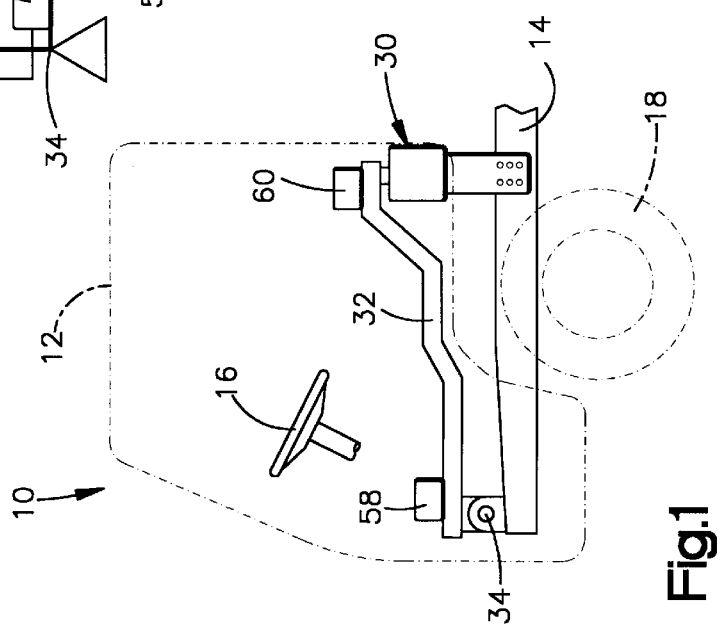
FIG. 1 is a schematic illustration of a vehicle having steerable wheels and an operator's cab which is movable relative to a frame of the vehicle.

A vehicle 10 (FIG. 1) includes an operator's cab 12 which is connected with and is movable relative to a frame 14 of the vehicle. The operator's cab 12 is of a known construction and contains controls for enabling an operator seated in the cab to drive the vehicle. The operator's controls include a steering wheel 16 which is connected with steerable vehicle wheels 18.

Figure 2:
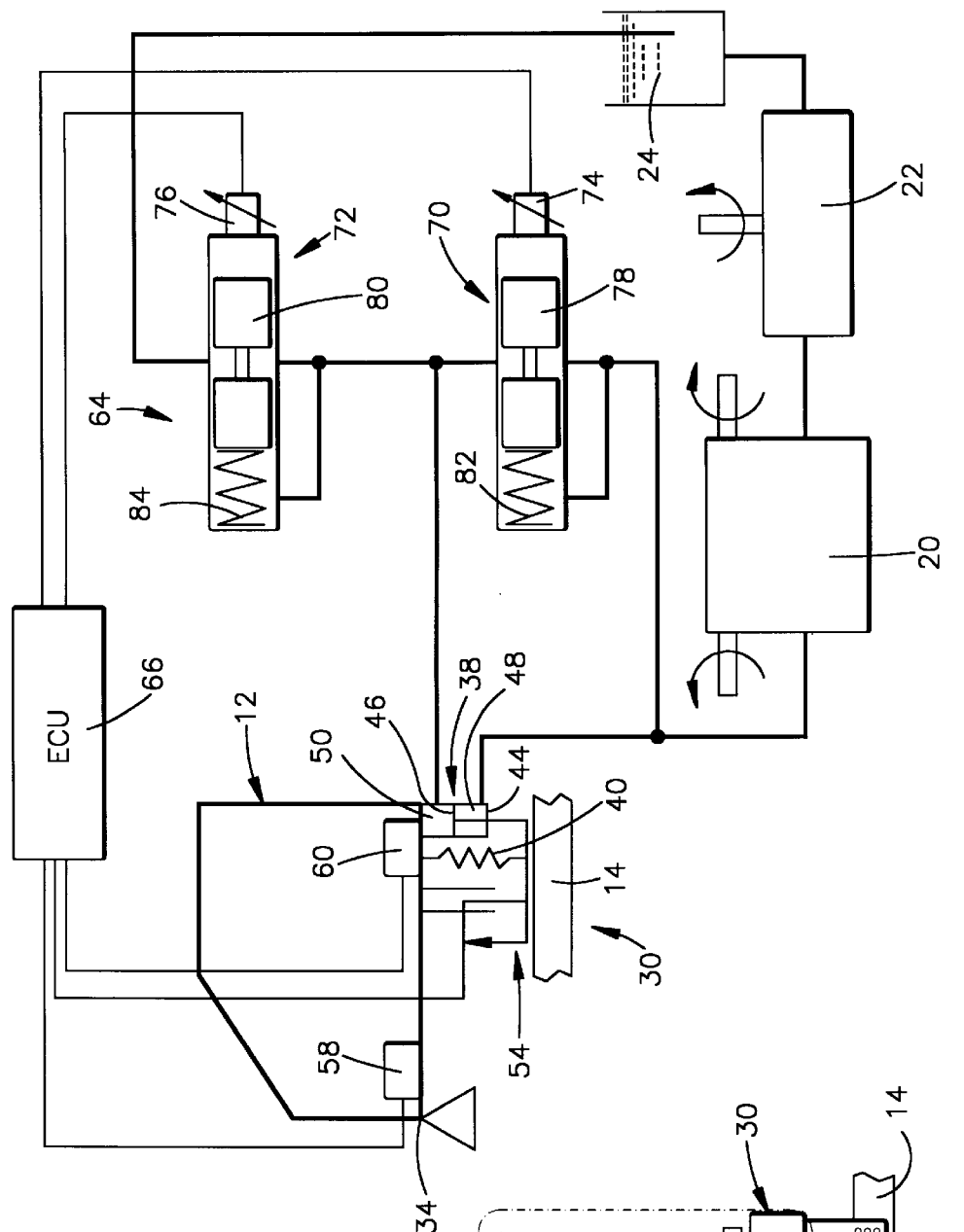
FIG. 2 is a schematic illustration of a cab motion control assembly which is operable to control motion of the operator's cab relative to the frame of the vehicle.

The steering wheel 16 is connected with a power steering motor 20 (FIG. 2). The power steering motor 20 is connected with the steerable vehicle wheels 18 (FIG. 1) and is operable to turn the steerable vehicle wheels in response to rotation of the steering wheel 16. A power steering pump 22 (FIG. 2) is operable to provide power steering fluid from a reservoir 24 to the power steering motor 20. The power steering pump 22 is driven by the engine (not shown) of the vehicle 10. The power steering motor 20 and power steering pump 22 have a known construction and mode of operation.

In accordance with one of the features of the present invention, a cab motion control assembly 30 (FIG. 1) is operable to control motion of the operator's cab 12 relative to the frame 14 of the vehicle 10. The cab motion control assembly 30 is disposed between a frame 32 of the operator's cab 12 and the frame 14 of the vehicle. The operator's cab frame 32 is pivotally connected with the frame 14 of the vehicle at a pivot connection 34.

The cab motion control assembly 30 is operable to reduce pitching movement of the operator's cab 12 relative to the frame 14 of the vehicle 10. During certain vehicle operating conditions, the operator's cab 12 will tend to pivot about the connection 34 with a pitching motion, that is, with an alternating downward plunging and upward rising movement of the operator's cab. The cab motion control assembly 30 opposes and thereby minimizes pitching motion of the operator's cab 12.

The cab motion control assembly 30 includes a cab motion control motor 38 (FIG. 2) and a spring 40 which are connected with the operator's cab 12 and frame 14 of the vehicle 10. The cab motion control motor 38 includes a motor cylinder 44 connected to the cab which encloses a piston 46 connected to the frame. The piston 46 divides the motor cylinder 44 into lower and upper variable volume chambers 48 and 50.

The piston 46 has an upwardly facing side surface which has an area which is twice as great as a downwardly facing side surface of the piston. Therefore, fluid pressure in the upper variable volume chamber 50 of the cab motion control motor 38 is applied against an area on the piston 46 which is twice as great as the area against which fluid pressure in the lower variable volume chamber 48 of the cab motion control motor is applied.

A cab position sensor 54 provides an output signal which varies as a function of variations in the position of the operator's cab 12 relative to the frame 14 of the vehicle. In the illustrated embodiment of the invention, the cab position sensor 54 is a linear voltage differential transformer having a known construction. The rate of change of the output from the cab position sensor 54 is indicative of the speed at which the operator's cab 12 is moving relative to the frame 14 of the vehicle.

In addition to the cab position sensor 54, the cab motion control assembly 30 includes front and rear accelerometers 58 and 60. The front accelerometer 58 provides an output which is indicative of the rate of change of the velocity of the forward portion of the operator's cab 12 of the vehicle 10. The rearward accelerometer 60 provides an output which is indicative of the rate of change of the velocity of the rearward portion of the operator's cab 12. Since the operator's cab 12 is pivotally connected with the frame 14 of the vehicle adjacent to the forward accelerometer 58, the output from the forward accelerometer corresponds to acceleration of the frame 14 of the vehicle. Since the rearward accelerometer 60 is spaced from the pivot connection 34 between the operator's cab 12 and frame 14 of the vehicle, the difference of output from the rearward accelerometer and the forward accelerometer is indicative of pitching acceleration of the operator's cab 12.

A motor control valve assembly 64 is operable to control operation of the cab motion control motor 38 as a function of the output from the cab position sensor 54 and the accelerometers 58 and 60. A control unit 66 is connected with the cab position sensor 54, accelerometers 58 and 60, and motor control valve assembly 64. The control unit 66 determines whether or not the output from the cab position sensor 54 and accelerometers 58 and 60 are indicative of impending pitching motion of the operator's cab 12. If the control unit 66 determines that there is impending pitching motion of the operator's cab 12, the control unit effects operation of the motor control valve assembly 64 and cab motion control motor 38 to oppose the impending pitching motion of the operator's cab.

In accordance with a feature of the present invention, the motor control valve assembly 64 is supplied with fluid from the reservoir 24 by the power steering pump 22. This enables the existing power steering pump 22 to be utilized to supply operating fluid pressure to the cab motion control motor 38.

In accordance with another feature of the present invention, the motor control valve assembly 64 includes a first valve 70 which is operable by the control unit 66 to control fluid pressure conducted to the lower variable volume chamber 48 of the cab motion control motor 38. A second valve 72 is operable to control the fluid pressure conducted to the upper variable volume chamber 50 of the cab motion control motor 38. The first and second valves 70 and 72 are of the solenoid type and have actuators 74 and 76 which are energizeable by the control unit 66.

Energization of an actuator 74 or 76 effects movement of an associated valve spool 78 or 80 to vary the fluid pressure conducted either to the lower or upper variable volume chambers 48 or 50. The valve spools 78 and 80 are biased toward initial positions by springs 82 and 84.

When the vehicle 10 is being driven, an operator in the cab 12 will rotate the steering wheel 16. Rotation of the steering wheel 16 actuates a known power steering control valve (not shown) to effect operation of the power steering motor 20. Operation of the power steering motor 20 turns the steerable vehicle wheels 18.

The power steering motor 20 is operated under the influence of high pressure fluid supplied by the power steering pump 22. Fluid exhausted from the power steering motor 20 is conducted through the first and second valves 70 and 72 in the motor control valve assembly 64 back to the reservoir 24. The valves 70 and 72 are both initially in an unactuated condition in which fluid can be freely conducted through the valves back to the reservoir 24.

During operation of the vehicle 10, it is contemplated that the vehicle will encounter conditions which will tend to cause pitching movement of the operator's cab 12 relative to the frame 14 of the vehicle. When this occurs, the input from the accelerometers 58 and 60 enable the control unit 66 to determine that operating forces which tend to induce pitching motion of the operator's cab 12 have been encountered. The operating forces which tend to induce pitching movement of the operator's cab 12 cause the rearward accelerometer 60 to experience a greater acceleration than the forward accelerometer 58 in either an upward or a downward direction.

When the input from the accelerometers 58 and 60 enables the control unit 66 to determine that there is an impending pitching motion of the operator's cab 12, the output from the cab position sensor 54 indicates whether this impending pitching motion will be in a clockwise or counterclockwise direction about the pivot connection 34. If the impending pitching motion is in a clockwise direction about the pivot connection 34, the output from the cab position sensor 54 will indicate a slight downward movement of the operator's cab 12 toward the frame 14 of the vehicle. Similarly, if there is an impending counterclockwise movement of the operator's cab 12 about the pivot connection 34, the output from the cab position sensor 54 will indicate a slight upward movement of the operator's cab relative to the frame 14 of the vehicle.

Assuming that the output from the cab position sensor 54 and the accelerometers 58 and 60 is such as to indicate an impending upward pitching movement of the operator's cab 12, the control unit 66 effects operation of the first valve 70 in the motor control valve assembly 64 to pressurize the lower variable volume chamber 48 in the cab motion control motor 38. Thus, the control unit 66 effects operation of the actuator 74 to move the valve spool 78 toward the right as viewed in FIG. 2. This partially blocks fluid flow through the first valve 70. The resulting increase in the fluid pressure conducted to the lower variable volume chamber 48 of the cab motion control motor 38 assists the spring 40 in resisting the impending upward pitching movement of the operator's cab 12.

Alternatively, if the output from the cab position sensor 54 and accelerometers 58 and 60 is such as to indicate an impending downward pitching movement of the operator's cab 12, the control unit 66 effects operation of the second valve 72 in the motor control valve assembly 64 to pressurize the upper variable volume chamber 50 of the cab motion control motor 38. Thus, the control unit 66 effects operation of the actuator 76 to move the valve spool 80 toward the right as viewed in FIG. 2. This partially blocks fluid flow through the second valve 72. The resulting increase in the fluid pressure conducted to the upper variable volume chamber 50 of the cab motion control motor 38 assists the spring 40 in resisting the impending downward pitching movement of the operator's cab.

When the second valve 72 in the motor control valve assembly 64 is operated to pressurize the upper variable volume chamber 50 of the cab motion control motor 38, the lower variable volume chamber 48 of the cab motion control motor is also pressurized. This is because restricting the flow of fluid from the second valve 72 to the reservoir 24 results in the transmission of fluid pressure through the first valve 70 to the lower variable volume chamber 48 of the cab motion control motor 38. However, the side of the piston 46 which faces toward the upper variable volume chamber 50 of the cab motion control motor 38 has a surface area which is twice as great as the surface area of the side of the piston which faces toward the lower variable volume chamber 48. Therefore, a greater force is applied to the upper side of the piston 46 than is applied to the lower side of the piston to provide a net force which resists the downward pitching movement of the operator's cab 12.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for use in a vehicle having an operator's cab which is movable relative to a frame of the vehicle, said apparatus comprising:

a cab motion control motor connected with the frame and cab of the vehicle and operable under the influence of fluid pressure to control motion of the cab relative to the frame, said cab motion control motor having first and second cylinder chambers disposed on opposite sides of a piston;

first motor control valve means for controlling fluid pressure conducted to said first cylinder chamber; and second motor control valve means for controlling fluid pressure conducted to said second cylinder chamber.

2. An apparatus as set forth in claim 1 further including a pump connected in fluid communication with said first motor control valve means to supply fluid under pressure to said first motor control valve means, said first motor control valve means being connected in fluid communication with said second motor control valve means to supply fluid under pressure to said second motor control valve means.

3. An apparatus as set forth in claim 1 wherein said apparatus includes sensor means for providing an output which is a function of the direction of movement of the cab of the vehicle relative to the frame of the vehicle, and control means for effecting operation of said first motor control valve means to increase the fluid pressure in said first cylinder chamber in response to said sensor means providing an output corresponding to movement of the cab of the vehicle in a first direction relative to the frame of the vehicle and for effecting operation of said second motor control valve means to increase the fluid pressure in said second cylinder chamber in response to said sensor means providing an output corresponding to movement of the cab of the vehicle in a second direction relative to the frame of the vehicle.

4. An apparatus as set forth in claim 1 wherein the vehicle has steerable vehicle wheels, said apparatus further including a power steering motor connected with the steerable vehicle wheels and operable under the influence of fluid pressure to turn the steerable vehicle wheels, a power steering pump connected in fluid communication with said power steering motor and with said first and second motor control valve means.

5. An apparatus for use in a vehicle having steerable vehicle wheels and an operator's cab which is movable relative to a frame of the vehicle, said apparatus comprising:

a power steering motor connected with the steerable vehicle wheels and operable under the influence of fluid pressure to turn the steerable vehicle wheels;

a cab motion control motor connected with the frame and cab of the vehicle and operable under the influence of fluid pressure to control motion of the cab relative to the frame;

a power steering pump connected in fluid communication with said power steering motor and said cab motion control motor; and valve means for controlling fluid pressure conducted from said power steering pump to said cab motion control motor;

wherein said cab motion control motor includes first and second cylinder chambers disposed on opposite sides of a piston, said valve means includes first motor control valve means for controlling fluid pressure conducted from said power steering pump to said first cylinder chamber and second motor control valve means for controlling fluid pressure conducted from said power steering pump to said second motor cylinder chamber.

\* \* \* \* \*